United States Patent [19]
Thioux et al.

[11] Patent Number: 5,168,966
[45] Date of Patent: Dec. 8, 1992

[54] BRAKE ASSEMBLY WITH HYDRAULIC BOOSTING

[75] Inventors: Alain Thioux, Bry-sur-Marne; Jean-Louis Magnaval, Neuilly-Plaisance; Patrice Moinard, Montreuil, all of France

[73] Assignee: Bendix Europe Services Techniques, Drancy, France

[21] Appl. No.: 704,492

[22] Filed: May 23, 1991

[30] Foreign Application Priority Data

May 31, 1990 [FR] France ................ 90 06772

[51] Int. Cl.$^5$ .................... B60T 11/16; B60T 13/18
[52] U.S. Cl. .................... 188/346; 188/141; 188/358
[58] Field of Search ........... 188/346, 355, 358, 140 A, 188/141

[56] References Cited

U.S. PATENT DOCUMENTS

| | | | |
|---|---|---|---|
| 2,419,113 | 4/1947 | Bricker | 188/152 |
| 3,700,075 | 10/1972 | Mortimer et al. | 188/346 |
| 4,865,164 | 9/1989 | Kaneda | 188/141 |
| 5,036,960 | 8/1991 | Schenk et al. | 188/346 |

FOREIGN PATENT DOCUMENTS

| | | |
|---|---|---|
| 1908977 | 9/1969 | Fed. Rep. of Germany . |
| 964918 | 8/1950 | France . |
| 1390259 | 1/1965 | France . |
| 2077504 | 10/1971 | France . |
| 951602 | 3/1964 | United Kingdom ........ 188/346 |
| 1225879 | 3/1971 | United Kingdom . |

Primary Examiner—George E. A. Halvosa
Attorney, Agent, or Firm—Larry J. Palguta; Ken C. Decker

[57] ABSTRACT

A brake assembly with hydraulic boosting, comprises at least one disk brake having a fixed part (1), a caliper (3), a brake motor (82) actuated by a fluid under pressure, a master cylinder (48) and a device (15) for recovering the energy dissipated during braking. The device (15) comprises at least one energy-recovering cylinder (21) with its piston (19) which is associated with the fixed part (1) and with the caliper (3) and the working chamber of which is connected fluidly to the brake motor (82). A hydraulic booster/limiter is connected between the energy-recovering cylinder (15) and the brake motor (82), the hydraulic booster/limiter being controlled by the pressure of the fluid generated in the master cylinder (48).

7 Claims, 2 Drawing Sheets

BRAKE ASSEMBLY WITH HYDRAULIC BOOSTING

BACKGROUND OF THE INVENTION

The present invention relates to a brake assembly with hydraulic boosting, comprising at least one disk-brake having a fixed part, a caliper and a brake motor actuated by a fluid under pressure, a master cylinder and a device for recovering the energy dissipated during braking.

Such assemblies are known in the art. For example, FR-A-1,390,259 describes such an assembly in which the recovered energy serves for generating a pressure exerted on an incompressible fluid feeding an additional chamber of the master cylinder, in order to boost the braking force.

GB-A-1 225 879 likewise describes such an assembly, but one in which the energy is recovered from the tangential displacement of the brake shoes during braking.

The particular disadvantage of these assemblies, besides their complexity, is that they are self-locking, the recovered energy not being controlled.

Moreover, the value of the recovered energy depends on the coefficient of friction of the shoes on the disk and is therefore not constant either from one shoe to the other or in time.

U.S. Pat. No.3,700,075 likewise describes such an assembly for a hydraulic circuit comprising at least two brake actuators. This intricate assembly does not allow the control of the torque on each brake.

An object of the present invention is to overcome these disadvantages.

SUMMARY OF THE INVENTION

The invention then relates to such an assembly in which the energy-recovering device comprises at least one energy-recovering cylinder with a piston which is associated with the fixed part and with the caliper and the working chamber of which is connected fluidly to the brake motor, and in which a hydraulic booster/limiter is connected between the energy-recovering cylinder and the brake motor, this hydraulic booster/limiter being controlled by the pressure of the fluid generated in the master cylinder.

According to the invention, the hydraulic booster/limiter comprises a first normally open valve interrupting communication between the energy-recovering cylinder and the brake motor when the pressure of the fluid in the brake motor is higher than the pressure generated in the master cylinder, multiplied by a boosting ratio defined by a ratio of active surfaces in the hydraulic booster/ limiter.

Likewise preferably, the hydraulic booster/limiter comprises a second normally open valve interrupting communication between the energy-recovering cylinder and the master cylinder as soon as the pressure in the latter is higher than the rest pressure.

It comprises, furthermore, a third normally closed valve putting the master cylinder and the brake motor in communication when the pressure generated in the master cylinder is higher than that generated in the energy-recovering cylinder.

According to one embodiment, the caliper is slideably mounted on and rotatable about a pin fixed to the fixed part, this rotation being at least limited by a moveable part of the energy-recovering cylinder. The caliper bears on the piston of the energy-recovering cylinder, the body of which is fixed to the fixed part.

According to one embodiment, the brake motor comprises two independent working chambers, of which one is connected directly to the master cylinder and the other is connected to the energy-recovering cylinder by means of the hydraulic booster/limiter.

BRIEF DESCRIPTION OF THE DRAWING

The invention will now be described by way of example with reference to the accompanying drawings in which.

DETAILED DESCRIPTION OF THE INVENTION

Figure 1:
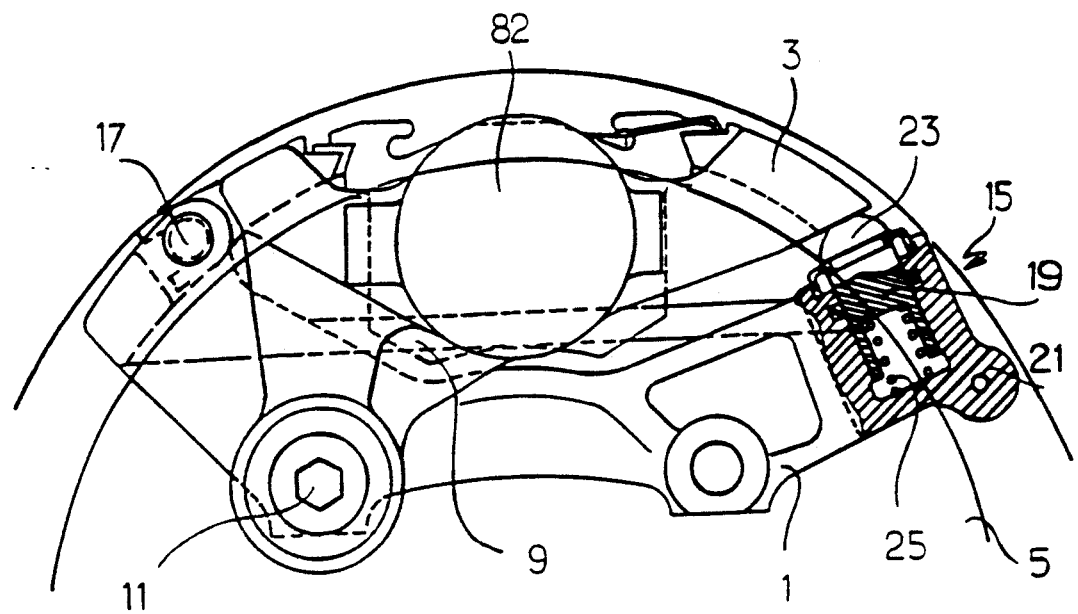
FIG. 1 shows a partially cut away diagrammatic side view of a disk-brake having an energy-recovering device according to the invention.

Referring now to the Figures, the disk-brake illustrated in FIG. 1 comprises a fixed part 1 fastened to the stub carrier of the wheel so equipped and a caliper 3 straddling the disk 5. A brake motor 82 comprising a piston lays a brake shoe 9 onto one face of the disk 5, while as a result of reaction the caliper 3 lays the other brake shoe onto the other face of the disk 5. The caliper is therefore of the sliding type here. For this purpose, a pin 11 fixed to the fixed part 1 defines a sliding surface for the caliper 3. A device 15 for recovering some of the energy dissipated during braking is associated with the fixed part 1 and with the caliper 3. An average person skilled in the art will understand that, during braking, the friction of the shoes on the disk results in forces exerted on the caliper 3 and transmitted to the chassis by means of the fixed part 1. In the example shown, the caliper 3 is freely rotatable about the pin 11, this rotation being limited by a stop 17 on the one hand and by the energy-recovering device 15 on the other hand.

When the disk 5 rotates in the clockwise direction (FIG. 1), corresponding to a normal operation of the vehicle (forward movement), the braking forces are in the highest proportion and are the greatest. For this purpose, the energy-recovering device 15 is arranged on the right in the Figure in order to serve as a support for the caliper during braking. Because the boost obtained is not necessary in the other direction, the stop 17 is usually sufficient to immobilize the caliper 3, but can be replaced by another device identical or similar to the device 15. The relative positions of the pin 11 and of the device 15 can allow the force exerted on the device 15 to be increased.

Figure 2:
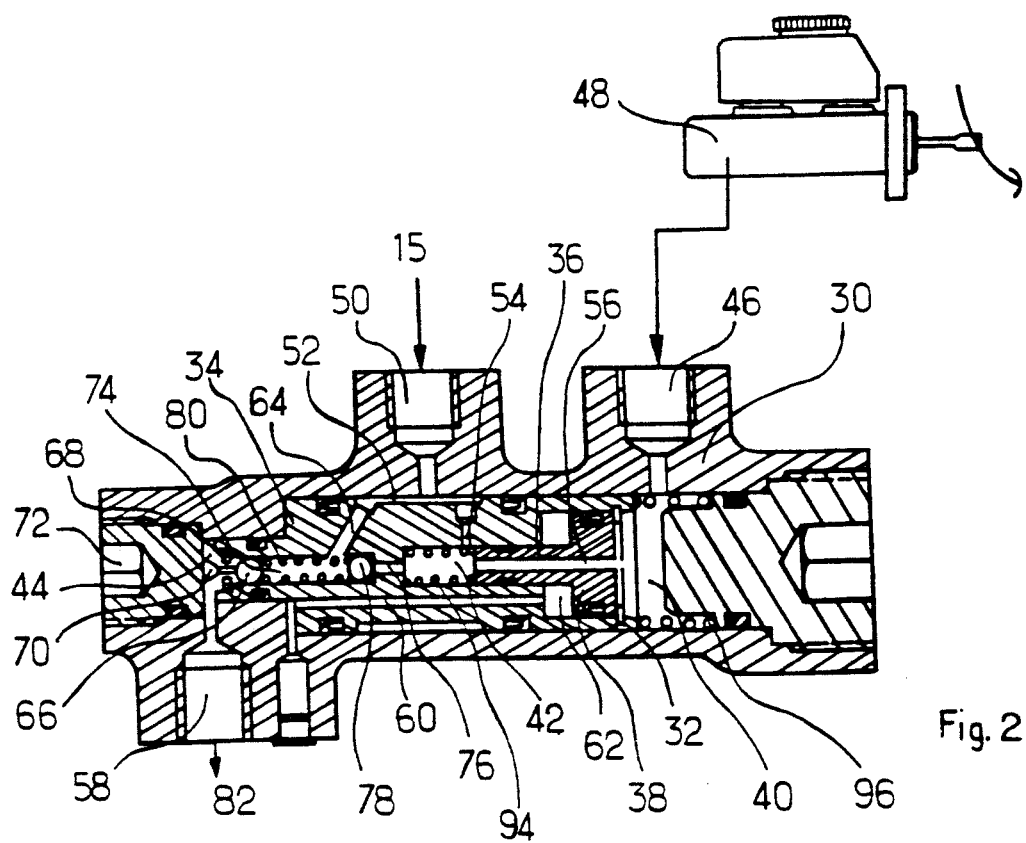
FIG. 2 shows diagrammatically, in section, a hydraulic booster/limiter according to the invention.

This device 15 consists of a cylinder with its piston 19. The body 21 of the device 15 is fixed to the fixed part 1, while the piston 19 receives the force exerted by the caliper 3 during braking, for example by means of a pusher 23. A return spring 25 arranged in the working chamber of the cylinder pushes the caliper into contact with the stop 17 in the rest position. The working chamber of the cylinder is connected fluidly to a brake motor actuating the brake by means of a hydraulic booster/limiter, as shown in FIG. 2, which is controlled by the pressure of the fluid in the master cylinder.

This hydraulic booster/limiter consists of a body 30, in which is made a stepped bore 32 which is closed on either side and in which a correspondingly stepped piston 34 slides. This piston 34 itself has a stepped bore 36 in which a second piston 38 slides. Three chambers 40, 42, 44 are thus defined. The chamber 40, closed by means of the two pistons 34 and 38, is connected by a conduit 46 to the master cylinder 48 from which it receives the fluid under pressure. The chamber 42 defined in the part of smallest diameter of the stepped bore 36 between the pistons 34 and 38 is connected, at rest, to the energy-recovering cylinder 15 by means of a conduit 50, a groove 52 made on the periphery of the piston 34 and a duct 54. The duct 54 is capable of being closed by the piston 38 as soon as a pressure higher than the rest pressure is established in the chamber 40. It will be noted that a duct 56 is likewise made in the piston 38 in order to put the chambers 40 and 42 in communication. The chamber 44 is itself connected by means of a conduit 58 to the hydraulic motor actuating the brake. A passage 60 is provided to prevent any under pressure or over pressure in the chamber 62 defined in the part of largest diameter of the stepped bore 36 between the two pistons 34 and 38. A conduit 64 connects the annular groove 52, communicating via the conduit 50 with the energy-recovering cylinder 15, and the chamber 44 by means of a chamber 74 and of a valve consisting, in the example shown, of a ball 66 arranged in the chamber 74 and pushed from its seat 68 integral with the piston 34 by a needle 70 integral with the plug 72 closing the bore 32 and the chamber 44. The ball 66, seat 68 and needle 70 comprise a valve 66, 68, 70. A duct 76 puts the chambers 42 and 74 in communication by means of a normally closed valve consisting, in the example shown, of a ball 78 closing this duct 76. A spring 80 carefully arranged in the chamber 74 returns the two balls 66 and 78 to the rest position.

Figure 3:
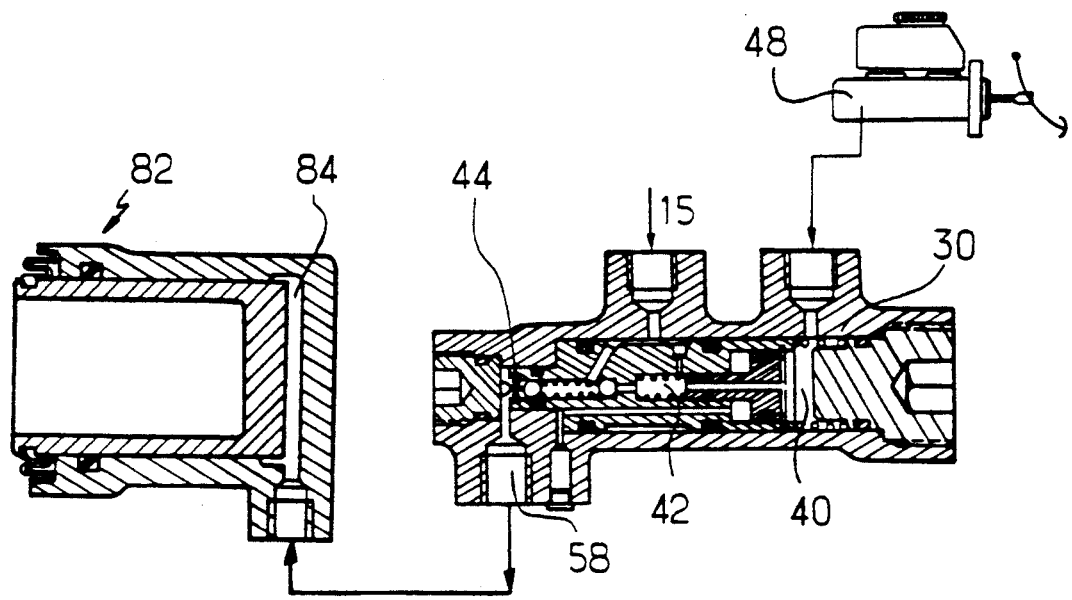
FIGS. 3 and 4 each illustrate a method of connection of an assembly according to the invention.
Figure 4:
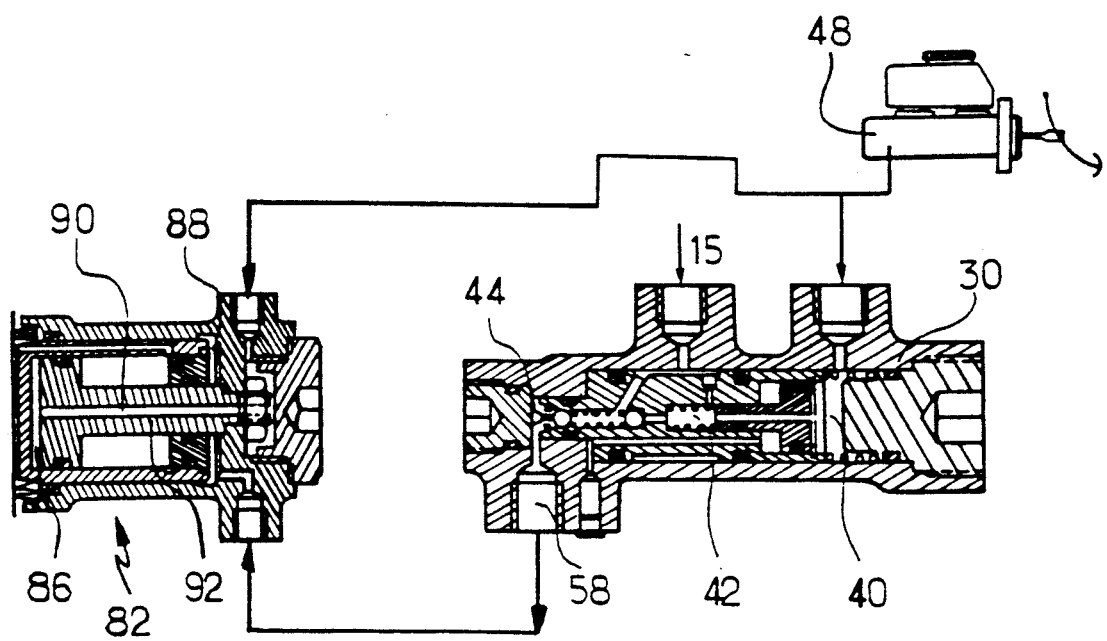

FIGS. 3 and 4 illustrate two methods of connecting the assembly according to the invention. In the method of FIG. 3, the master cylinder 48 is not connected directly to the hydraulic brake motor 82. The latter is connected to the conduit 58 communicating with the chamber 44. The motor 82 is of the conventional type with a single working chamber 84.

In the embodiment illustrated in FIG. 4, the motor 82 is of the type with two working chambers 86, 88, the forces of which are added together. A conduit 90 made in the protuberance 92 of the body of the motor makes it possible to put the chamber 86 in communication with the master cylinder 48; the chamber 88 is connected to the conduit 58 so as to communicate with the chamber 44 of the hydraulic booster/limiter.

At all events, the assembly functions as follows. Starting from the state of rest shown, when the driver of the vehicle so equipped presses on the brake pedal when it is running in forward movement, a pressure is generated in the master cylinder 48 and is transmitted to the chamber 40 of the hydraulic booster/limiter. The piston 38 slides immediately and closes the conduit 54. Because of the duct 56, the pressure likewise rises in the chamber 42 and the valve 78 opens, feeding fluid under pressure to the chamber 44 via the open valve 66, the conduit 58 and the brake motor 82. The brake shoes coming in contact with the disk 5, and the caliper 3 tilts about the pin 11 in order to displace the piston 19 of the energy-recovering cylinder 15. The pressure generated in the working chamber of this piston is then applied to the chamber 74 by way of the conduit 50, the groove 52 and the conduit 64. When this latter pressure reaches that generated in the master cylinder 48, the ball 78 closes the duct 76 and this pressure appears in the chamber 44.

The ratio of the diameters of the piston 34 will then define this closing moment of the valve 66, 68, 70. This ratio is a boosting ratio of the pressures of the master cylinder 48 and energy-recovering cylinder 15. This ensures a strict control of the pressure prevailing in the brake motor 82 by means of the successive openings and closings of the valve 66, 68, 70, this pressure then being equal to that generated in the master cylinder 48, multiplied by the abovementioned boosting ratio.

When the driver releases the brake, the pressure falls in the chambers 40 and 42 and the pistons 34 and 38 are displaced to the right (FIG. 2) under the effect of the residual pressure in the chamber 44. A spring 94 arranged between the two pistons 34 and 36 shifts these away from one another. Since the pressure decreases in the brake motor 82, the reaction pressure in the working chamber of the energy-recovering cylinder likewise decreases until it falls completely when communication between the ducts 54 and 56 is reestablished. When the difference between the pressures prevailing in the chambers 74 and 44 is higher than a value determined by the calibration of the spring 80, the valve 66, 68, 70 opens causing the pressure of the fluid in the brake motor 82 to decrease even further. When the effect of this is less than the force exerted by the return spring 96, the piston 34 is pushed up against the shoulder of the bore 32 (to the left in FIG. 2) and the valve 66, 68, 70 is kept open. These operations ensure a good release of the system.

If the driver brakes when the vehicle is moving in reverse, no pressure is generated in the working chamber of the energy-recovering cylinder, the caliper 3 coming to bear on the stop 17.

The brake motor 82 is thus fed as in the first part of the abovedescribed functioning, no pressure boosting then taking place.

An average person skilled in the art will understand that a careful choice of the ratios of active surfaces is necessary for correctly putting the invention into practice, especially that of the piston 19 in relation to that of the working chamber 84 or 88 of the brake motor 82 connected to the chamber 44 and those of the stepped piston 34.

In a preferred and tested embodiment, these ratios are as follows:

* Active surface 19 / surface of working chamber 84 or 88 = ½

* Ratio of the cross-sections of the stepped piston 34 = 1/5.

This ensures a hydraulic boosting completely free of the variations in the coefficient of friction of the shoes on the disk and controlled fully by the driver of the vehicle Many modifications can be made to this assembly by an average person skilled in the art, without departing from the scope of the invention, as defined by the accompanying claims.

What we claim is:

1. A brake assembly with hydraulic boosting, comprising at least one disc brake having a fixed part, a caliper, a brake motor actuated by a fluid under pressure, a master cylinder, a device for recovering the energy dissipated during braking comprising at least one energy-recovering cylinder with a piston which is associated with said fixed part and with said caliper and a working chamber of which is connected fluidly to said brake motor, and a hydraulic booster/limiter connected between said energy-recovering cylinder and said brake motor, said hydraulic booster/limiter being controlled by fluid pressure of the fluid generated in the master cylinder and comprising a first normally open valve operable to interrupt communication between said energy-recovering cylinder and brake motor when the pressure of the fluid in said brake motor is higher than the pressure generated in the master cylinder, multiplied by a boosting ratio defined by a ratio of active surfaces in said hydraulic booster/limiter, and a second normally open valve operable to interrupt communication between said energy-recovering cylinder and master cylinder as soon as the pressure in the master cylinder is higher than a rest pressure.

2. The assembly according to claim 1, wherein said hydraulic booster/limiter comprises a third normally closed valve operable to place said master cylinder and brake motor in communication when the pressure generated in the master cylinder is higher than the pressure generated in the energy-recovering cylinder.

3. The assembly according to claim 1, wherein said hydraulic booster/limiter consists of a body, in which is made a first stepped bore in which slides a first stepped piston operating said first valve, said first piston comprising a second stepped bore, in which slides a second stepped piston operating said second valve.

4. The assembly according to claim 3, wherein said second piston is a hollow piston placing stepped parts of said second stepped bore in communication, a face of said second piston receiving the pressure generated in the master cylinder and another face forming said second valve.

5. The assembly according to claim 1, wherein said caliper is mounted slidably and rotatably about a pin fixed to said fixed part, said rotation being at least limited by a movable part of said energy-recovering cylinder.

6. The assembly according to claim 5, wherein said caliper bears on said piston of said energy-recovering cylinder, a body of the energy-recovering cylinder being fixed to said fixed part.

7. The assembly according to claim 1, wherein said brake motor comprises two independent working chambers one of which is connected directly to the master cylinder and the other connected to said energy-recovering cylinder by means of said hydraulic booster/limiter.

* * * * *